United States Patent
Mushiake et al.

(10) Patent No.: US 11,629,089 B2
(45) Date of Patent: Apr. 18, 2023

(54) PLATE GLASS

(71) Applicant: Nippon Electric Glass Co., Ltd., Shiga (JP)

(72) Inventors: Atsushi Mushiake, Shiga (JP); Takashi Murata, Shiga (JP); Ryota Suzuki, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 23 days.

(21) Appl. No.: 15/734,354

(22) PCT Filed: Jun. 18, 2019

(86) PCT No.: PCT/JP2019/024077
§ 371 (c)(1),
(2) Date: Dec. 2, 2020

(87) PCT Pub. No.: WO2020/004140
PCT Pub. Date: Jan. 2, 2020

(65) Prior Publication Data
US 2021/0221728 A1 Jul. 22, 2021

(30) Foreign Application Priority Data
Jun. 26, 2018 (JP) .............................. JP2018-120480

(51) Int. Cl.
*C03C 3/078* (2006.01)
*F21V 8/00* (2006.01)

(52) U.S. Cl.
CPC ............ *C03C 3/078* (2013.01); *G02B 6/0011* (2013.01)

(58) Field of Classification Search
CPC .............................. C03C 3/073; G02B 6/0011
See application file for complete search history.

(56) References Cited

U.S. PATENT DOCUMENTS

| | | |
|---|---|---|
| 2013/0070344 A1 | 3/2013 | Takeda et al. |
| 2018/0172998 A1 | 6/2018 | Tekolste et al. |
| 2018/0217317 A1 | 8/2018 | Yanase et al. |
| 2019/0004324 A1 | 1/2019 | Wang et al. |
| 2020/0026085 A1 | 1/2020 | Tekolste et al. |
| 2020/0301149 A1 | 9/2020 | Tekolste et al. |

FOREIGN PATENT DOCUMENTS

| | | |
|---|---|---|
| CN | 106324847 | 1/2017 |
| JP | 2013-61593 | 4/2013 |
| JP | 2018-506068 | 3/2018 |
| WO | 2016/123145 | 8/2016 |
| WO | 2017/018375 | 2/2017 |

OTHER PUBLICATIONS

International Search Report dated Aug. 27, 2019 in International (PCT) Application No. PCT/JP2019/024077.
International Preliminary Report on Patentability and Written Opinion of the International Searching Authority dated Dec. 29, 2020 in International (PCT) Application No. PCT/JP2019/024077.

*Primary Examiner* — Mary Ellen Bowman
(74) *Attorney, Agent, or Firm* — Wenderoth, Lind & Ponack, L.L.P.

(57) ABSTRACT

A glass sheet of the present invention is characterized in that: the glass sheet has a refractive index nd of from 1.55 to 2.30; the glass sheet has an inclined surface in at least a part of an end surface; an angle formed by the inclined surface and a principal surface is from 5° to 85°; and the inclined surface has a surface roughness Ra of 1 μm or less.

5 Claims, 2 Drawing Sheets

PLATE GLASS

TECHNICAL FIELD

The present invention relates to a glass sheet suitable for a light-guiding plate of a head-mounted display.

BACKGROUND ART

In recent years, as head-mounted displays, there have been developed various types, such as a hat-type device and an eyeglass-type device. The hat-type device is utilized in many cases as a system for a user to experience virtual reality (VR) while covering a field of view of the user. The eyeglass-type device is utilized in many cases as a system for a user to experience augmented reality (AR) without blocking a field of view of the user.

In the head-mounted display, a light-guiding plate having permeability is used in some cases. In this case, for example, the user can see an image displayed on the light-guiding plate while seeing a view of the outside or the like (see-through device). In addition, for example, 3D display can be achieved by displaying different images on the light-guiding plates corresponding to the left and right pupils of the user, or an image can be directly projected onto the retina of the user by coupling the image to the retina through use of the crystalline lens of the pupil.

As a method of displaying an image through use of a light-guiding plate, there is given a method involving allowing collimated light to enter the light-guiding plate through an end surface thereof, and extracting the incident light to the outside through a diffraction phenomenon while causing the incident light to be totally reflected in the light-guiding plate, to thereby allow the light to enter the pupil of the user.

In this case, the light-guiding plate may be formed of a glass sheet laminate obtained by laminating a plurality of glass sheets each having an uneven structure on one of principal surfaces (for example, see Patent Literature 1 and Patent Literature 2). Herein, the uneven structure of the glass sheet is used, for example, for easily causing the diffraction phenomenon, and the glass sheet laminate structure is used, for example, for causing an image that is visually recognized by the user to have a sense of depth by displaying different images on the respective glass sheets, to thereby obtain an advantage in that 3D display having a sense of reality can be easily achieved.

CITATION LIST

Patent Literature 1: JP 2018-506068 A
Patent Literature 2: CN 106324847 A

SUMMARY OF INVENTION

Technical Problem

When a general-purpose low-refractive glass (for example, a glass having a refractive index nd of about 1.49) is used as a glass sheet forming a light-guiding plate of a head-mounted display, a minimum incident angle that causes total reflection is increased, and hence light is not easily propagated while being totally reflected repeatedly in the glass sheet. As a result, it becomes difficult to increase the degree of freedom in optical design.

Further, when collimated light is allowed to enter the glass sheet through a principal surface side thereof, it is required to increase the incident angle of the light in order to cause total reflection in the glass sheet. In this case, an optical diffraction element is used in order to adjust the traveling path of the light, but in this case, the step of bonding the optical diffraction element to the glass sheet is required. In addition, when collimated light is allowed to enter the glass sheet through an end surface thereof, it is required to provide an optical system on the end surface of the glass sheet. In this case, a device is increased in size.

The present invention has an object to provide a glass sheet that can increase the degree of freedom in optical design in a light-guiding plate of a head-mounted display or the like.

Solution to Problem

As a result of extensive investigations, the inventors of the present invention have found that the above-mentioned technical object can be achieved by using a glass sheet having a high refractive index, and having an inclined surface in a part of an end surface. Thus, the inventors propose this finding as the present invention. That is, according to one embodiment of the present invention, there is provided a glass sheet, characterized in that: the glass sheet has a refractive index nd of from 1.55 to 2.30; the glass sheet has an inclined surface in at least a part of an end surface; an angle formed by the inclined surface and a principal surface is from 5° to 85°; and the inclined surface has a surface roughness Ra of 1 μm or less. Herein, the term "refractive index nd" refers to a value measured through use of a refractometer (e.g., refractometer KPR-2000 manufactured by Shimadzu Corporation). The phrase "angle formed by the inclined surface and a principal surface" refers to, though the angle varies depending on two principal surfaces opposed to each other in a sheet thickness direction, a smaller angle in the present invention. The term "surface roughness Ra" refers to a value measured through use of a surfcorder ET-4000AK manufactured by Kosaka Laboratory Ltd. in accordance with JIS B-0601 (1994).

The glass sheet according to the one embodiment of the present invention has a refractive index nd of from 1.55 to 2.30. With this, when the glass sheet is used in a light-guiding plate of a head-mounted display or the like, total reflection of light easily occurs, and the degree of freedom in optical design can be increased.

In addition, the glass sheet according to the one embodiment of the present invention has the inclined surface in at least a part of the end surface, and the angle formed by the inclined surface and the principal surface is from 5° to 85°. With this, when the inclined surface or the principal surface on an opposite side to the inclined surface is irradiated with light in a direction perpendicular to the principal surface, light is easily propagated in the glass sheet. As a result, an optical diffraction element is not required, and a device can be reduced in size.

FIG. 1 is a sectional view for illustrating an example of the glass sheet according to the one embodiment of the present invention. A glass sheet 1 has two principal surfaces 10 (front surface and back surface) opposed to each other in the sheet thickness direction, and a part of an end surface 11 forms an inclined surface 12. An angle θ formed by the principal surface 10 and the inclined surface 12 is 35°. In FIG. 1, the principal surface 10 and the inclined surface 12 are directly connected to each other. However, in order to increase the strength of the glass sheet 1, a chamfered surface (for example, a rounded chamfered surface) may be formed between the principal surface 10 and the inclined surface 12. FIG. 2 is a sectional view for illustrating an example of the glass sheet 1 according to the one embodiment of the present invention. The difference from FIG. 1 is that the inclined surface 12 is not formed over the entire sheet thickness direction, but is partially formed. Also in FIG. 2, the angle θ formed by the principal surface 10 and the inclined surface 12 is 35°. In the same manner as in FIG. 1, a chamfered surface may be formed between the end surface 11 and the inclined surface 12.

FIGS. 3A and B are each a schematic sectional view for illustrating a direction in which light travels in the glass sheet. In FIG. 3A, there is illustrated a direction in which light travels in the glass sheet when the light is directly radiated to the inclined surface, and in FIG. 3B, there is illustrated a direction in which light travels in the glass sheet when the light is radiated to the principal surface on an opposite side to the inclined surface. In both FIG. 3A and FIG. 3B, the light changes a traveling path thereof on the inclined surface, and is propagated while being totally reflected in the glass sheet.

Further, in the glass sheet according to the one embodiment of the present invention, the surface roughness Ra of the inclined surface is 1 μm or less. With this, the light is not easily scattered from the inclined surface. As a result, light is easily propagated in the glass plate.

In addition, it is preferred that, in the glass sheet according to the one embodiment of the present invention, at least one of the principal surfaces have a surface roughness Ra of 100 nm or less. With this, the light is easily totally reflected in the glass sheet.

In addition, it is preferred that the glass sheet according to the one embodiment of the present invention comprise a glass composition, in terms of mass %, 10% to 60% of $SiO_2$, 1% to 40% of BaO, and 0.5% to 40% of $TiO_2+La_2O_3$. With this, it becomes easy to manufacture a glass sheet high in devitrification resistance and refractive index. Herein, the term "$TiO_2+La_2O_3$" refers to the total amount of $TiO_2$ and $La_2O_3$.

In addition, it is preferred that, in the glass sheet according to the one embodiment of the present invention, one of the principal surfaces have an uneven structure thereon. With this, the light guided in the glass sheet is easily output to the outside. As a result, an image of the head-mounted display becomes clear.

In addition, it is preferred that the glass sheet according to the one embodiment of the present invention be used for a light-guiding plate of a head-mounted display.

DESCRIPTION OF EMBODIMENTS

Figure 1:
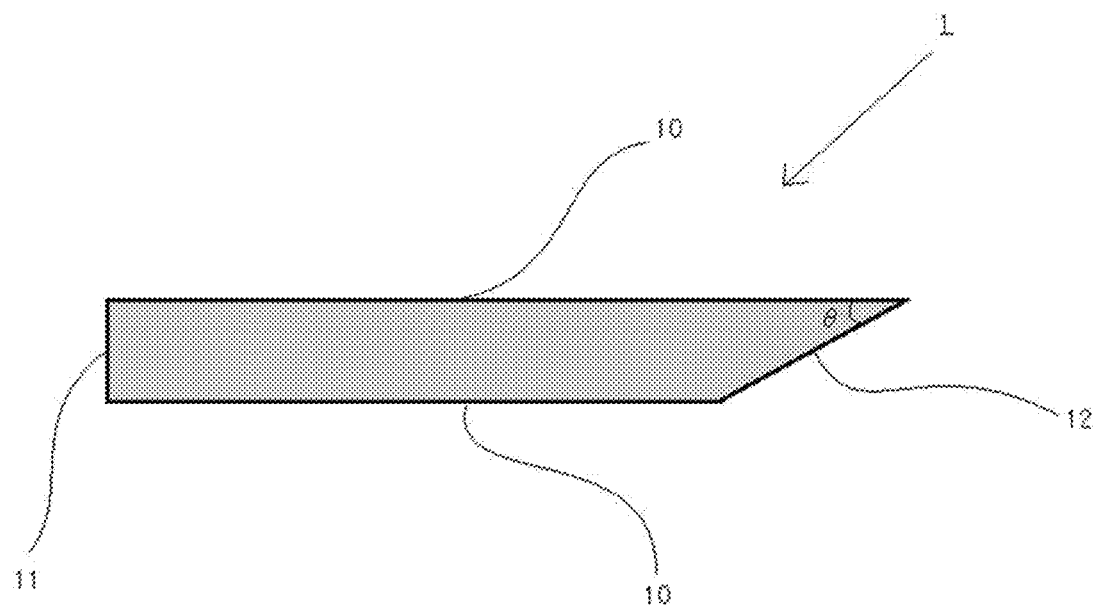
FIG. 1 is a schematic sectional view for illustrating an example of a glass sheet of the present invention.
Figure 2:
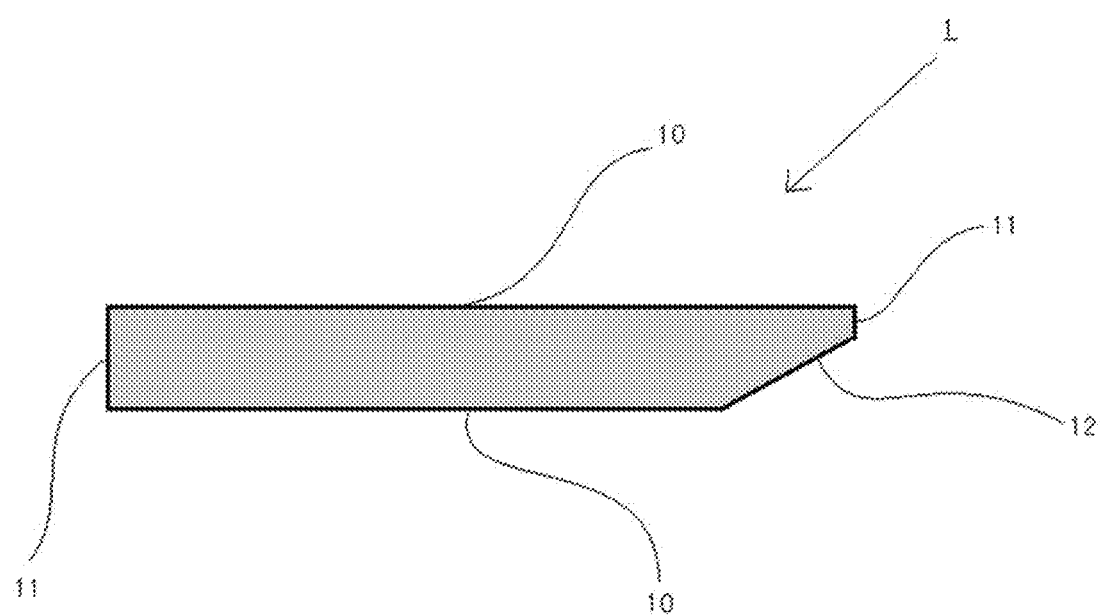
FIG. 2 is a schematic sectional view for illustrating an example of the glass sheet of the present invention.
Figure 3A:
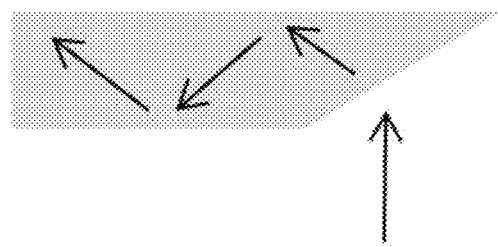
FIG. 3A is a schematic sectional view for illustrating a direction in which light travels in the glass sheet.
Figure 3B:
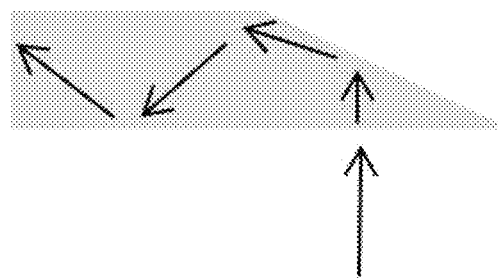
FIG. 3B is a schematic sectional view for illustrating a direction in which light travels in the glass sheet.

In a glass sheet of the present invention, a refractive index nd is 1.55 or more, preferably 1.58 or more, 1.60 or more, 1.63 or more, 1.65 or more, or 1.68 or more, particularly preferably 1.70 or more. When the refractive index is excessively low, total reflection of light does not easily occur in the glass sheet, and the degree of freedom in optical design is liable to be decreased. Meanwhile, when the refractive index nd is excessively high, a glass skeleton is liable to become unstable. In this case, the glass skeleton is not easily formed into a sheet shape, and hence the production efficiency of the glass sheet is liable to be decreased. Thus, the refractive index nd is 2.30 or less, preferably 2.00 or less, 1.90 or less, or 1.85 or less, particularly preferably 1.80 or less.

In the glass sheet of the present invention, an inclined surface is formed in at least a part of an end surface (preferably, of four end surfaces, an entirety or a part of one of the end surfaces is an inclined surface), and an angle formed by the inclined surface and a principal surface is from 5° to 85°, preferably from 20° to 70°, particularly preferably from 30° to 60°. In the case where the angle formed by the inclined surface and the principal surface does not fall within the above-mentioned ranges, when light is radiated from the principal surface side to the inclined surface, the light is not easily propagated in the glass sheet.

The surface roughness Ra of the inclined surface is 1 μm or less, preferably 500 nm or less, 100 nm or less, 10 nm or less, or 2 nm or less, particularly preferably 1 nm or less. When the surface roughness Ra of the inclined surface is excessively large, the light is easily scattered from the inclined surface. As a result, the light is not easily propagated in the glass sheet.

As a method of producing an inclined surface in a part of an end surface, various methods may be adopted. For example, a method of forming an inclined surface by grinding and polishing, a method of forming an inclined surface by laser processing, and a method of forming an inclined surface by hot pressing may be adopted.

In the glass sheet of the present invention, the surface roughness Ra of at least one of the principal surfaces (preferably both the principal surfaces) is preferably 100 nm or less, 10 nm or less, 2 nm or less, or 1 nm or less, particularly preferably 0.5 nm or less. When the surface roughness Ra of the principal surface is excessively large, the light is not easily totally reflected in the glass sheet.

The glass sheet preferably comprises as a glass composition, in terms of mass %, 10% to 60% of $SiO_2$, 1% to 40% of BaO, and 0.5% to 40% of $TiO_2+La_2O_3$. The reasons why the glass composition is specified as described above are described below. In the description of the content range of each component, "%" means "mass %".

The content of $SiO_2$ is preferably from 10% to 60%. When the content of $SiO_2$ decreases, it is difficult to forma glass network structure, resulting in difficulty in vitrification. In addition, viscosity at high temperature excessively lowers and hence it is difficult to ensure a high liquidus viscosity. Thus, the content of $SiO_2$ is preferably 15% or more, 20% or more, 25% or more, or 30% or more, particularly preferably 35% or more. Meanwhile, when the content of $SiO_2$ increases, meltability and formability are liable to lower, and the refractive index is liable to lower. Thus, the content of $SiO_2$ is preferably 55% or less, 51% or less, 48% or less, or 45% or less, particularly preferably 42% or less.

BaO is a component that increases the refractive index without extremely lowering the viscosity at high temperature among alkaline-earth metal oxides. The content of BaO is preferably from 1% to 40%. When the content of BaO increases, the liquidus viscosity is liable to lower, and the refractive index, a density, and a thermal expansion coefficient are liable to increase. Thus, the content of BaO is preferably 35% or less, 32% or less, 30% or less, particularly preferably 28% or less. Meanwhile, when the content of BaO decreases, it is difficult to obtain a desired refractive index, and it is difficult to ensure a high liquidus viscosity. Thus, the content of BaO is preferably 5% or more, 10% or more, 12% or more, 15% or more, 17% or more, 20% or more, or 23% or more, particularly preferably 25% or more.

$TiO_2$ and $La_2O_3$ are each a component that effectively increases the refractive index. Thus, the total amount of $TiO_2$ and $La_2O_3$ is preferably 0.5% or more, 1% or more, 3% or more, 5% or more, 8% or more, 11% or more, or 15% or more, particularly preferably 17% or more. Meanwhile, when the total amount of $TiO_2$ and $La_2O_3$ increases, devitrification resistance is liable to lower. Thus, the total amount of $TiO_2$ and $La_2O_3$ is preferably 40% or less, 30% or less, or 25% or less, particularly preferably 22% or less.

$TiO_2$ is a component that increases the refractive index to the highest extent among general oxides excluding heavy metal oxides, such as rare-earth oxides. However, when the content of $TiO_2$ increases, glass is colored and the devitrification resistance is liable to lower. Thus, the content of $TiO_2$ is preferably from 0% to 35%, from 0.1% to 30%, from 0.1% to 15%, from 1% to 12%, from 2% to 11%, or from 3% to 10%, particularly preferably from 4% to 9%. When priority is given to increasing the refractive index rather than improving the devitrification resistance, the content of $TiO_2$ is preferably from 7% to 35% or from 15% to 32%, particularly preferably from 20% to 30%.

$La_2O_3$ is a component that effectively increases the refractive index. However, when the content of $La_2O_3$ increases, a liquidus temperature is liable to lower. Thus, the content of $La_2O_3$ is preferably from 0% to 15%, from 0% to 13%, or from 5% to 12%, particularly preferably from 7% to 11%.

In addition to the above-mentioned components, for example, the following components may be added as optional components.

The content of $Al_2O_3$ is preferably from 0% to 8%. When the content of $Al_2O_3$ increases, devitrified crystals are liable to deposit at the time of forming, the liquidus viscosity is liable to lower, and the refractive index is liable to lower. Thus, the content of $Al_2O_3$ is preferably 8% or less or 7% or less, particularly preferably 6% or less. Meanwhile, when the content of $Al_2O_3$ decreases, the balance of the glass composition is disturbed, and the glass is liable to devitrify contrarily. Thus, the content of $Al_2O_3$ is preferably 0.1% or more, 0.5% or more, 1% or more, or 3% or more, particularly preferably 5% or more.

The content of $B_2O_3$ is preferably from 0% to 15%. When the content of $B_2O_3$ increases, the refractive index and a Young's modulus are liable to lower. Thus, the content of $B_2O_3$ is preferably 9% or less or 8% or less, particularly preferably 7% or less. Meanwhile, when the content of $B_2O_3$ decreases, the liquidus temperature is liable to lower. Thus, the content of $B_2O_3$ is preferably 1% or more or 3% or more, particularly preferably 5% or more.

The content of MgO is preferably from 0% to 12%. MgO is a component that increases the Young's modulus and is a component that lowers the viscosity at high temperature. However, when MgO is contained in a large amount, the refractive index is liable to lower, and the liquidus temperature rises, with the result that the devitrification resistance lowers, and the density and the thermal expansion coefficient increase excessively. Thus, the content of MgO is preferably 10% or less, 5% or less, 3% or less, 2% or less, 1.5% or less, or 1% or less, particularly preferably 0.5% or less.

The content of CaO is preferably from 0% to 15%. When the content of CaO increases, the density and the thermal expansion coefficient are liable to increase. When the content of CaO is extremely large, the balance of the glass composition is disturbed, and the devitrification resistance is liable to lower. Thus, the content of CaO is preferably 13% or less, 10% or less, or 8% or less, particularly preferably 7% or less. Meanwhile, when the content of CaO decreases, the meltability is liable to lower, the Young's modulus is liable to lower, and the refractive index is liable to lower. Thus, the content of CaO is preferably 0.5% or more, 1% or more, 3% or more, or 4% or more, particularly preferably 5% or more.

The content of SrO is preferably from 0% to 15%. When the content of SrO increases, the refractive index, the density, and the thermal expansion coefficient are liable to increase. When the content of SrO is extremely large, the balance of the glass composition is disturbed, and the devitrification resistance is liable to lower. Thus, the content of SrO is preferably 13% or less or 12% or less, particularly preferably 11% or less. Meanwhile, when the content of SrO decreases, the meltability is liable to lower, and the refractive index is liable to lower. Thus, the content of SrO is preferably 1% or more, 3% or more, 5% or more, or 7% or more, particularly preferably 10% or more.

The content of ZnO is preferably from 0% to 15%. However, when the content of ZnO increases, the density and the thermal expansion coefficient increase. When the content of ZnO becomes excessive, the component balance of the glass composition is disturbed, and it is difficult to ensure a high liquidus viscosity. Thus, the content of ZnO is preferably 15% or less, 12% or less, 10% or less, 8% or less, or 6% or less, particularly preferably 4% or less. Meanwhile, when the content of ZnO decreases, it is difficult to ensure a high liquidus viscosity. Thus, the content of ZnO is preferably 0.1% or more, 0.5% or more, more than 1%, 1.5% or more, 2% or more, or 2.5% or more, particularly preferably 3% or more.

$ZrO_2$ is a component that increases the refractive index. However, when the content of $ZrO_2$ increases, the liquidus temperature is liable to lower. Thus, the content of $ZrO_2$ is preferably from 0% to 10%, from 0.1% to 7%, or from 0.5% to 6%, particularly preferably from 1% to 5.5%.

$Nb_2O_5$ is a component that increases the refractive index. However, when the content of $Nb_2O_5$ increases, material cost is liable to increase. Thus, the content of $Nb_2O_5$ is preferably from 0% to 30%, from 1% to 25%, from 5% to 23%, or from 10% to 22%, particularly preferably from 15% to 21%.

$Li_2O$, $Na_2O$, and $K_2O$ are each a component that lowers the viscosity at high temperature and are each a component that increases the thermal expansion coefficient. However, when those components are introduced in large amounts, the viscosity at high temperature excessively lowers, and it is difficult to ensure a high liquidus viscosity. Thus, the total amount of $Li_2O$, $Na_2O$, and $K_2O$ is preferably 15% or less, 10% or less, 5% or less, 2% or less, 1% or less, or 0.5% or less, particularly preferably 0.1% or less. In addition, the content of each of $Li_2O$, $Na_2O$, and $K_2O$ is preferably 10% or less, 8% or less, 5% or less, 2% or less, 1% or less, or 0.5% or less, particularly preferably 0.1% or less.

When priority is given to lowering the viscosity at high temperature rather than improving the liquidus viscosity, the total amount of $Li_2O$, $Na_2O$, and $K_2O$ is preferably from 0.1% to 25%, from 5% to 23%, or from 10% to 20%, particularly preferably from 12% to 18%. In addition, the content of $Li_2O$ is preferably 10% or less, 8% or less, 5% or less, 2% or less, 1% or less, or 0.5% or less, particularly preferably 0.1% or less. The content of $Na_2O$ is preferably from 1% to 22%, from 3% to 20%, or from 5% to 15%, particularly preferably from 8% to 12%. The content of $K_2O$ is preferably from 0.1% to 10%, from 1% to 9%, or from 2% to 8%, particularly preferably from 3% to 7%.

As a fining agent, one kind or two or more kinds selected from the group consisting of $As_2O_3$, $Sb_2O_3$, $CeO_2$, $SnO_2$, F, Cl, and $SO_3$ may be added in an amount within the range of from 0% to 1%. However, from the environmental viewpoint, it is preferred that the use of $As_2O_3$, $Sb_2O_3$, and F be avoided as much as possible, and it is preferred that the content of each of $As_2O_3$, $Sb_2O_3$, and F be less than 0.1%. The content of $CeO_2$ is preferably from 0% to 1% or from 0.01% to 0.5%, particularly preferably from 0.05% to 0.4%. In addition, the content of $SnO_2$ is preferably from 0% to 1% or from 0.01% to 0.5%, particularly preferably from 0.05% to 0.4%. In addition, the total amount of $SnO_2$, $SO_3$, and Cl is preferably from 0% to 1%, from 0.001% to 1%, or from 0.01% to 0.5%, particularly preferably from 0.05% to 0.3%.

PbO is a component that lowers the viscosity at high temperature. However, from the environmental viewpoint, it is preferred that the use of PbO be avoided as much as possible. The content of PbO is preferably 0.5% or less, particularly preferably less than 0.1%.

$Bi_2O_3$, $Gd_2O_3$, $Ta_2O_5$, and $WO_3$ are each a component that increases the refractive index, but are expensive and difficult to obtain in large amounts, and hence the use thereof is desirably avoided as much as possible. The content of each of those components is preferably 1% or less, particularly preferably 0.5% or less.

$Fe_2O_3$ and $Cr_2O_3$ are components that are mixed as impurities in raw materials. When those components increase, the internal transmittance of the glass sheet is liable to lower. Thus, the content of $Fe_2O_3$ is preferably 500 ppm (0.05%) or less, 200 ppm or less, 100 ppm or less, or 50 ppm or less, particularly preferably 30 ppm or less. The content of $Cr_2O_3$ is preferably 5 ppm (0.0005%) or less, 3 ppm or less, 2 ppm or less, or 1 ppm or less, particularly preferably 0.5 ppm or less. The use of high-purity glass raw materials can reduce the contents of $Fe_2O_3$ and $Cr_2O_3$.

It is preferred that the glass sheet of the present invention have the following characteristics.

The glass sheet has a density of preferably 5.0 $g/cm^3$ or less, 4.8 $g/cm^3$ or less, 4.5 $g/cm^3$ or less, 4.3 $g/cm^3$ or less, or 3.7 $g/cm^3$ or less, particularly preferably 3.5 $g/cm^3$ or less. With this, a device can be reduced in weight. The "density" may be measured by a well-known Archimedes method.

The glass sheet has a thermal expansion coefficient of preferably from $30 \times 10^{-7}/°$ C. to $100 \times 10^{-7}/°$ C., from $40 \times 10^{-7}/°$ C. to $90 \times 10^{-7}/°$ C., or from $60 \times 10^{-7}/°$ C. to $85 \times 10^{-7}/°$ C., particularly preferably from $65 \times 10^{7}/°$ C. to $80 \times 10^{-7}/°$ C. In the case where the thermal expansion coefficient does not fall within the above-mentioned ranges, when a functional film, such as a reflective film, is formed on the surface of the glass sheet, the glass sheet is liable to be warped. The "thermal expansion coefficient" is a value measured with a dilatometer, and refers to an average value in the temperature range of from 30° C. to 380° C.

The glass sheet has a strain point of preferably 500° C. or more, 550° C. or more, 600° C. or more, or 620° C. or more, particularly preferably 640° C. or more. When the strain point is excessively low, the glass sheet is liable to undergo heat shrinkage even when high-temperature heat treatment is performed during the manufacturing process of a device. The "strain point" refers to a value measured in accordance with a method of ASTM C336.

The glass sheet has a temperature at a viscosity at high temperature of $10^{2.5}$ dPa·s of preferably 1,400° C. or less, 1,300° C. or less, 1,200° C. or less, particularly preferably 1,100° C. or less. With this, the meltability lowers, and the production efficiency of the glass sheet lowers. The term "temperature at a viscosity at high temperature of $10^{2.5}$ dPa·s" refers to a value measured by a platinum sphere pull up method.

The glass sheet has a liquidus temperature of preferably 1,200° C. or less, 1,150° C. or less, 1,130° C. or less, 1,110° C. or less, 1,050° C. or less, 1,030° C. or less, 1,000° C. or less, or 980° C. or less, particularly preferably 950° C. or less. In addition, the glass sheet has a liquidus viscosity of preferably $10^{3.0}$ dPa·s or more, $10^{3.5}$ dPa·s or more, $10^{4.0}$ dPa·s or more, $10^{4.5}$ dPa·s or more, $10^{4.8}$ dPa·s or more, $10^{5.0}$ dPa·s or more, or $10^{5.2}$ dPa·s or more, particularly preferably $10^{5.13}$ dPa·s or more. With this, the glass is less liable to devitrify at the time of forming, and the glass sheet is easily formed by a float method, an overflow down-draw method, or the like. Herein, the term "liquidus viscosity" refers to a value obtained by measuring the viscosity of glass at its liquidus temperature by a platinum sphere pull up method. The term "liquidus temperature" refers to a value obtained by measuring a temperature at which crystals of glass deposit after glass powder that has passed through a standard 30-mesh sieve (500 μm) and remained on a 50-mesh sieve (300 μm) is placed in a platinum boat and kept in a gradient heating furnace for 24 hours.

The glass sheet has an internal transmittance at an optical path length of 10 mm and a wavelength of 550 nm of preferably 80% or more, 85% or more, or 90% or more, particularly preferably 95% or more. When the internal transmittance is excessively low, an optical loss in the glass sheet increases.

In the glass sheet of the present invention, the sheet thickness is preferably 3 mm or less or 2 mm or less, particularly preferably 1 mm or less, and is preferably 0.01 mm or more or 0.03 mm or more, particularly preferably 0.05 mm or more. When the sheet thickness of the glass sheet is excessively large, the mass of the glass sheet increases, and hence the glass sheet is not easily applied to a light-guiding plate of a head-mounted display or the like. Meanwhile, when the sheet thickness of the glass sheet is excessively small, handling becomes difficult in assembly of a device.

It is preferred that the glass sheet of the present invention be formed by an overflow down-draw method, a slot down method, a re-draw method, a float method, or a roll-out method, and it is particularly preferred that the glass sheet of the present invention be formed by the overflow down-draw method. With this, the surface smoothness of the principal surface of the glass sheet can be enhanced.

It is preferred that a plurality of glass sheets of the present invention be laminated to form a laminate. With this, different images can be projected in a depth direction of a display image, and 3D display can be easily achieved. As a lamination method, it is preferred that glass sheets respectively corresponding to red display, green display, and blue display be laminated. The number of the glass sheets to be laminated is, for example, 3 or more or 5 or more, particularly 10 or more.

In the glass sheet of the present invention, it is preferred that one of the principal surfaces have an uneven structure thereon. With this, the light propagated in the glass sheet is easily output to the outside. As a result, an image of the head-mounted display becomes clear. As the uneven structure, for example, a structure in which a periodic structure is formed and light is extracted to the outside through a diffraction phenomenon is preferred. As a method of forming the uneven structure, for example, there may be adopted methods such as a photolithography method, a sputtering method using a mask, a method involving forming a uniform film and then locally etching the film through use of a laser, and an imprint method using a mold.

Examples

Now, the present invention is described in detail based on Examples. The following Examples are merely illustrative. The present invention is by no means limited to the following Examples.

In Table 1, Sample No. 1 to Sample No. 10 are shown. The "N.A." in the table means unmeasured.

point is a value measured based on a method of ASTM C338. The temperatures at viscosities at high temperature of $10^{4.0}$ dPa·s, $10^{3.0}$ dPa·s, $10^{2.5}$ dPa·s, and $10^{2.0}$ dPa·s are values measured by a platinum sphere pull up method.

The liquidus temperature is a value obtained by measuring a temperature at which crystals of glass deposit when glass powder that has passed through a standard 30-mesh sieve (500 μm) and remained on a 50-mesh sieve (300 μm) is placed in a platinum boat and kept in a gradient heating furnace for 24 hours. In addition, the liquidus viscosity is a

TABLE 1

| (Mass %) | No. 1 | No. 2 | No. 3 | No. 4 | No. 5 | No. 6 | No. 7 | No. 8 | No. 9 | No. 10 |
|---|---|---|---|---|---|---|---|---|---|---|
| $SiO_2$ | 39.9 | 40.9 | 32.4 | 32.4 | 30.3 | 30.0 | 28.5 | 29.7 | 29.4 | 29.4 |
| $Al_2O_3$ | 5.1 | 5.0 | 2.5 | 1.5 | 0.0 | 0.0 | 0.0 | 0.0 | 0.0 | 0.0 |
| $B_2O_3$ | 5.1 | 5.0 | 7.4 | 7.4 | 0.0 | 0.0 | 0.0 | 0.0 | 0.0 | 0.0 |
| $Na_2O$ | 0.0 | 0.0 | 0.0 | 0.0 | 10.6 | 10.1 | 9.0 | 10.5 | 10.7 | 10.8 |
| $K_2O$ | 0.0 | 0.0 | 0.0 | 0.0 | 4.8 | 5.0 | 5.0 | 5.0 | 4.9 | 5.2 |
| MgO | 0.0 | 0.0 | 0.0 | 0.5 | 0.0 | 0.0 | 0.0 | 0.0 | 0.0 | 0.0 |
| CaO | 3.0 | 3.0 | 2.9 | 6.2 | 0.0 | 0.0 | 0.0 | 0.0 | 0.0 | 0.0 |
| SrO | 11.2 | 11.2 | 6.9 | 3.9 | 0.0 | 0.0 | 0.0 | 0.0 | 0.0 | 0.0 |
| BaO | 26.9 | 25.2 | 27.2 | 27.0 | 8.6 | 8.6 | 8.9 | 7.4 | 9.0 | 7.4 |
| ZnO | 3.1 | 3.0 | 1.0 | 1.0 | 0.0 | 0.0 | 0.0 | 0.0 | 0.0 | 0.0 |
| $TiO_2$ | 3.6 | 4.6 | 6.7 | 9.7 | 24.4 | 25.4 | 28.9 | 26.3 | 25.5 | 25.9 |
| $ZrO_2$ | 2.0 | 2.0 | 2.2 | 0.6 | 0.0 | 0.0 | 0.0 | 0.0 | 0.0 | 0.0 |
| $La_2O_3$ | 0.0 | 0.0 | 10.3 | 9.4 | 0.0 | 0.0 | 0.0 | 0.0 | 0.0 | 0.0 |
| $Nb_2O_5$ | 0.0 | 0.0 | 0.0 | 0.0 | 20.2 | 20.0 | 18.5 | 20.1 | 19.4 | 20.5 |
| $Sb_2O_3$ | 0.1 | 0.1 | 0.1 | 0.1 | 0.0 | 0.0 | 0.0 | 0.0 | 0.0 | 0.0 |
| $SnO_2$ | 0.0 | 0.0 | 0.3 | 0.3 | 0.0 | 0.0 | 0.0 | 0.0 | 0.0 | 0.0 |
| $CeO_2$ | 0.0 | 0.0 | 0.0 | 0.0 | 0.1 | 0.1 | 0.2 | 0.1 | 0.0 | 0.1 |
| Cl | 0.0 | 0.0 | 0.1 | 0.0 | 0.0 | 0.0 | 0.0 | 0.0 | 0.0 | 0.0 |
| $TiO_2 + La_2O_3$ | 3.6 | 4.6 | 17.0 | 19.1 | 24.4 | 25.4 | 28.9 | 26.3 | 25.5 | 25.9 |
| Density (g/cm³) | 3.408 | 3.375 | 3.680 | 3.627 | N.A. | N.A. | N.A. | N.A. | N.A. | N.A. |
| α (×10⁻⁷/° C.) | 72.0 | 70.7 | 77.2 | 79.6 | N.A. | N.A. | N.A. | N.A. | N.A. | N.A. |
| Strain point (° C.) | 633 | 641 | 642 | 640 | N.A. | N.A. | N.A. | N.A. | N.A. | N.A. |
| Annealing point (° C.) | 672 | 679 | 676 | 673 | N.A. | N.A. | N.A. | N.A. | N.A. | N.A. |
| Softening point (° C.) | 813 | 824 | 799 | 790 | N.A. | N.A. | N.A. | N.A. | N.A. | N.A. |
| $10^{4.0}$ dPa·s (° C.) | 1,009 | 1,019 | 959 | 936 | N.A. | N.A. | N.A. | N.A. | N.A. | N.A. |
| $10^{3.0}$ dPa·s (° C.) | 1,110 | 1,119 | 1,036 | 1,005 | N.A. | N.A. | N.A. | N.A. | N.A. | N.A. |
| $10^{2.5}$ dPa·s (° C.) | 1,174 | 1,186 | 1,087 | 1,051 | N.A. | N.A. | N.A. | N.A. | N.A. | N.A. |
| $10^{2.0}$ dPa·s (° C.) | 1,271 | 1,271 | 1,150 | 1,109 | N.A. | N.A. | N.A. | N.A. | N.A. | N.A. |
| Liquidus temperature (° C.) | 947 | 930 | 892 | 921 | N.A. | N.A. | N.A. | N.A. | N.A. | N.A. |
| Liquidus viscosity (dPa·s) | 4.9 | 5.3 | 5.2 | 4.3 | N.A. | N.A. | N.A. | N.A. | N.A. | N.A. |
| nd | 1.628 | 1.630 | 1.684 | 1.701 | 1.792 | 1.798 | 1.808 | 1.802 | 1.807 | 1.800 |

Each sample in Table 1 was prepared as described below. First, glass raw materials were blended so as to achieve the glass composition shown in Table 1, and the resultant was melted at 1,400° C. for 24 hours by using a platinum pot. Next, the resultant molten glass was poured onto a carbon sheet and formed into a flat sheet shape. The resultant glass sheet was evaluated for properties in Table 1.

The density is a value measured by a well-known Archimedes method.

The thermal expansion coefficient α is a value measured with a dilatometer and is an average value in the temperature range of from 30° C. to 380° C.

The strain point and the annealing point are values measured based on a method of ASTM C336. The softening value obtained by measuring the viscosity of glass at its liquidus temperature by a platinum sphere pull up method.

The refractive index nd is a value obtained by producing samples each having a rectangular parallelepiped shape measuring 25 mm by 25 mm by about 3 mm, then subjecting the samples to annealing treatment at a cooling rate of 0.1° C./min in the temperature range of from (annealing point+ 30° C.) to (strain point−50° C.), and subsequently performing measurement with a refractometer KPR-2000 manufactured by Shimadzu Corporation under a state in which an immersion liquid having a refractive index nd matching to that of the samples is applied between glasses.

Subsequently, glass raw materials were blended so as to achieve the glass composition of Sample No. 1 in Table 1, and a glass batch thus obtained was melted in a continuous melting furnace. After that, the resultant was formed into a sheet shape having a sheet thickness of 1 mm by an overflow down-draw method to obtain respective glass sheets each having a principal surface with a surface roughness Ra of 0.2 nm. In a part of an end surface of each of the obtained glass sheets, an inclined surface was formed over an entire sheet thickness direction through use of a grinding stone, and the glass sheet was processed so that an angle formed by the inclined surface and the principal surface was 60°, and the surface roughness Ra of the inclined surface was 0.2 nm.

Subsequently, a periodic uneven structure made of $SiO_2$ was formed on one of the principal surfaces of each of the glass sheets by a photolithography method, and a gap in the uneven structure was filled with a resin. Seven glass sheets thus obtained were laminated to obtain a laminate. Further, a laminate was obtained by the same method also in Sample No. 4 in Table 1.

In addition, glass raw materials were blended so as to achieve the glass composition of Sample No. 2 in Table 1, and a glass batch thus obtained was melted in a continuous melting furnace. After that, the resultant was formed into a sheet shape having a sheet thickness of 0.5 mm by an overflow down-draw method to obtain respective glass sheets each having a principal surface with a surface roughness Ra of 0.2 nm. In a part of an end surface of each of the obtained glass sheets, an inclined surface was formed over an entire sheet thickness direction through use of laser light, and the glass sheet was processed so that an angle formed by the inclined surface and the principal surface was 30°, and the surface roughness Ra of the inclined surface was 0.5 nm.

Subsequently, a periodic uneven structure made of $SiO_2$ was formed on one of the principal surfaces of each of the glass sheets by a sputtering method using a mask, and a gap in the uneven structure was filled with a resin. Ten glass sheets thus obtained were laminated to obtain a laminate. Further, a laminate was obtained by the same method also in Sample No. 3 in Table 1.

In each of the laminates thus obtained, when the inclined surface of each of the glass sheets or the principal surface on an opposite side to the inclined surface is irradiated with light perpendicular to the principal surface, the incident light can be propagated in each of the glass sheets. Thus, each of the laminates can be used suitably as a light-guiding plate of a head-mounted display.

REFERENCE SIGNS LIST

1 glass sheet
10 principal surface
11 end surface
12 inclined surface

The invention claimed is:
1. A glass sheet, characterized in that:
 the glass sheet has a refractive index nd of from 1.55 to 2.30;
 the glass sheet has an inclined surface in at least a part of an end surface;
 an angle formed by the inclined surface and a principal surface is from 5° to 85°; and
 the inclined surface has a surface roughness Ra of 1 μm or less.
2. The glass sheet according to claim 1, wherein at least one of the principal surfaces has a surface roughness Ra of 100 nm or less.
3. The glass sheet according to claim 1, wherein the glass sheet comprises as a glass composition, in terms of mass %, 10% to 60% of $SiO_2$, 1% to 40% of BaO, and 0.5% to 40% of $TiO_2+La_2O_3$.
4. The glass sheet according to claim 1, wherein one of the principal surfaces has an uneven structure thereon.
5. The glass sheet according to claim 1, wherein the glass sheet is used for a light-guiding plate of a head-mounted display.

* * * * *